Oct. 9, 1928.

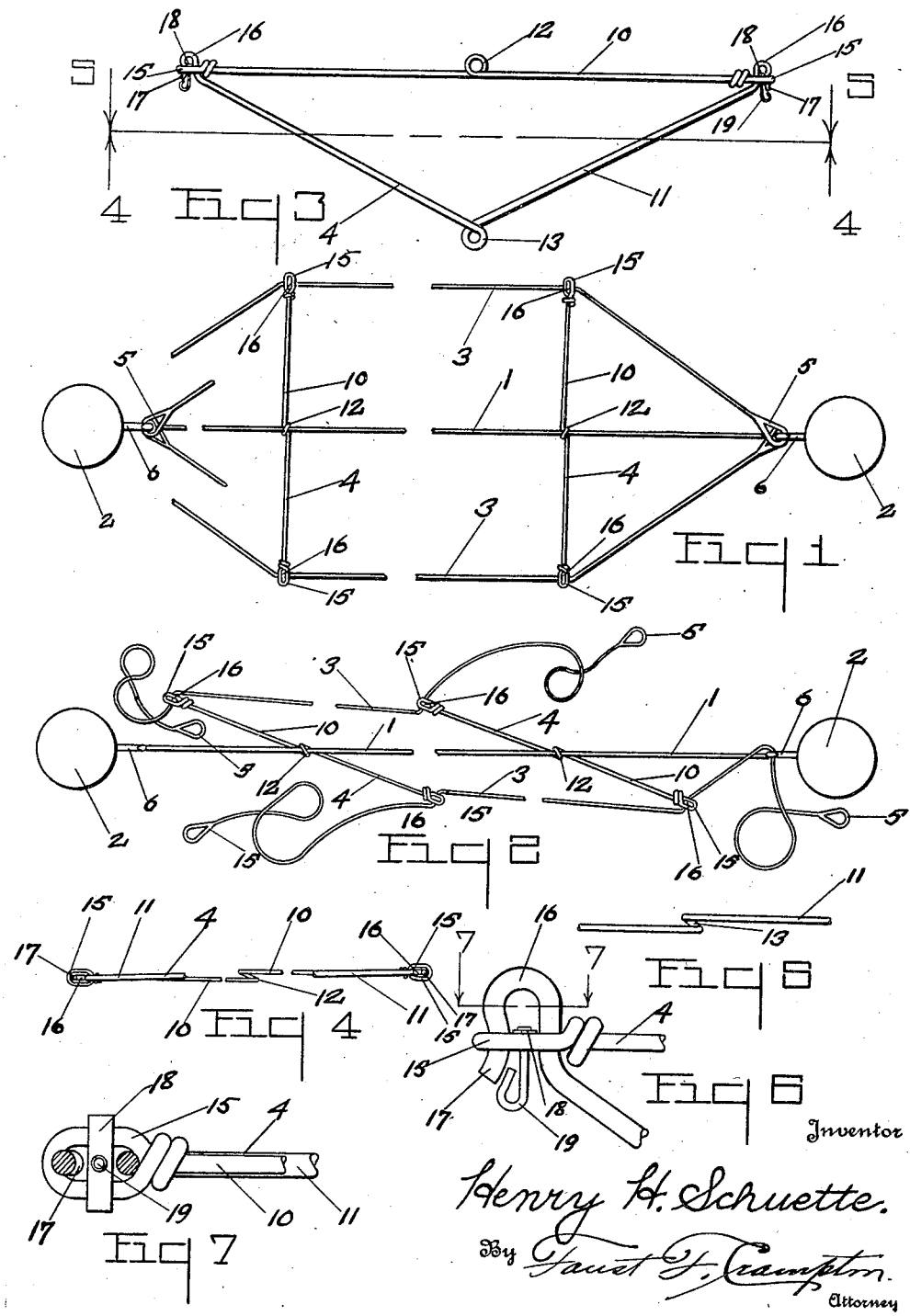

H. H. SCHUETTE 1,686,576

FENCE PROTECTOR

Filed Feb. 15, 1928

2 Sheets-Sheet 2

Inventor
Henry H. Schuette.
By Faust F. Crampton
Attorney

Patented Oct. 9, 1928.

1,686,576

UNITED STATES PATENT OFFICE.

HENRY H. SCHUETTE, OF NAPOLEON, OHIO.

FENCE PROTECTOR.

Application filed February 15, 1928. Serial No. 254,373.

My invention has for its object to provide a fence protector to prevent the top of wire fences from being stretched and torn down by horses and cattle that commonly reach over the top of fences to reach for grass or other vegetation located in adjoining fields. By my invention, the fence is protected by wires that extend parallel to the fence and are located at the top and along lines that are displaced a distance extending in lateral directions from opposite sides of the top of the fence so as to prevent stock from reaching the vegetation in fields adjoining to the field in which the stock may be located. The parallel wires thus operate to prevent the stretching of the top wire of the fence and also to prevent breaking down of the wire fence.

The invention particularly provides an improved means for supporting the wires that extend parallel to and in spaced relation with the top of the fence, whereby the said means may be readily connected to parallel wires of the fence and to the parallel wires located in spaced relation to the fence. The means for supporting the parallel protecting wires may be connected to the uppermost pairs of parallel wires of the fence or to pairs of parallel wires intermediate the top and bottom of the fence. Also, I have found that the use of my invention is particularly advantageous for preventing smaller stock, such as pigs, from passing beneath the fence, since the means for supporting parallel wires may be so located as to position the parallel protecting wires on the surface of the ground and substantially in the plane or below the plane of the lowermost wire of the fence, whereby there will be located three wires in spaced relation along the bottom of the fence which materially interferes with the movement of pigs or other small stock beneath the fence.

The invention may be contained in protective fence structures of different forms and, to illustrate a practical application of the invention, I have selected a device, and a modification thereof, which is illustrative of the various structures in which the invention may be embodied. The particular devices selected are shown in the accompanying drawing and are described hereinafter.

Figure 8:
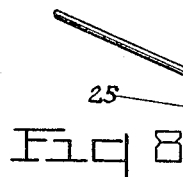
Figure 9:
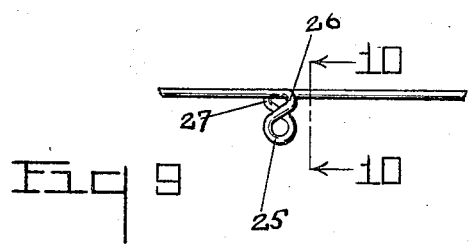
Figure 10:
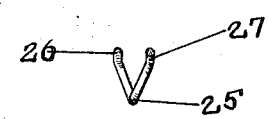
Figure 11:
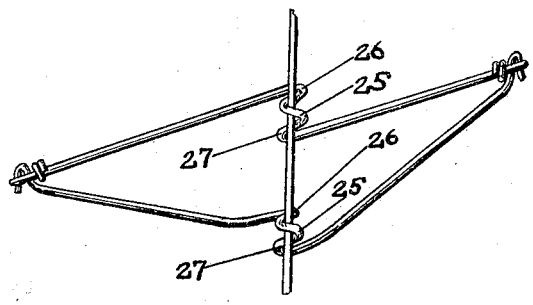

Fig. 1 is a top view of the fence protective device. Fig. 2 illustrates a top view of the fence protective device when the parts are in positions in which they may be placed when it is desired to work the soil close to the fence. Fig. 3 is a side view of the wire supporting device. Fig. 4 is a view of a section taken on the plane of the line 4—4 indicated in Fig. 3. Fig. 5 is a view of a section taken on the plane of the line 5—5 indicated in Fig. 3. Fig. 6 is a side view of one of the ends of the spacing member. Fig. 7 is a view of a section taken on the plane of the line 7—7 indicated in Fig. 6. Fig. 8 is a side view of a part of one of the elements showing a looped portion extending at right angles to the plane of the element. Fig. 9 illustrates a form of element where the looped portion is located in the plane of the spacing member. Fig. 10 illustrates a view of a section taken on the plane of the line 10—10 indicated in Fig. 9. Fig. 11 illustrates a perspective view of the modified form of construction.

The fence 1, illustrated in Figs. 1 and 2, is the well known wire fence having a plurality of parallel wires extending lengthwise of the fence and a plurality of cross wires that space the parallel wires together and form with the parallel wires the usual wire fence fabric. The wire fence is connected to posts 2, between which the fence wire is stretched in the manner well known in the art. The posts 2 shown in Figs. 1 and 2 are the end posts of the fence.

A pair of parallel protective wires are supported on opposite sides of the fence 1 and are spaced from the fence 1 by spacing members, or supporting members, 4 that operate to hold the wires 3 in their protective relation to the fence 1 and so as to prevent stock from reaching over the top of the fence to browse in a field adjoining to that in which they are located. The supporting members 4 are also so connected that they may be moved through nearly 180 degrees in order to be located in planes that make angles with the plane of the fence that approximate 180 degrees. When they are thus located in planes that approximate the plane of the fence 1, the wires 3 that are connected to the outer ends of the members 4 will be located in juxtaposed relation to the sides of the fence. When, therefore, it is desired to work close to the side of the fence, the members 4 may be rotated by pulling one of the wires 3 to draw all of the devices 4 so that they will rotate and be placed in planes that approximate the plane of the fence 1.

In order to position the devices 4 in planes that are at right angles to the plane of the fence, the ends of the wires 3 may be provided with means for connecting them to the posts 2. In the form of construction shown, the ends of the wires 3 are bent to form eyes 5 that may be placed over hooks 6 that are secured to the posts 2 and, when it is desired to angularly move the members 4 and thus place the wires 3 close to the plane of the fence 1, one of the eyes 5 may be unhooked from one of the hooks 6 and the other wire may be drawn so as to swing all of the members 4 and thus place the wires 3 close to the fence 1.

My invention particularly relates to the construction of the spacing members 4 and provides in that connection spacing members that may be connected to parallel wires of the fence 1, the construction being such that the connection may be readily made and the protective wires may be readily connected to the ends of the members 4. The spacing members or devices 4 are formed of two wires 10 and 11 that are so disposed relative to each other as to co-act to form a rigid support for the wires 3 as against the pressure that would ordinarily be produced by animals reaching over the fence to browse on the grass or other vegetation located in an adjoining field. The wire 10 is ordinarily secured to the top wire of the fence and the wire 11 is secured to a parallel wire of the fence. Thus the wire 10, when secured to the fence, normally extends in a direction at right angles to the plane of the fence, while the wire 11 is bent in the form of a V and the legs of the wire extend diagonally upward from the lower of the two parallel wires and in a direction to brace the upper wire 10 and also in a direction that will more effectively resist the pressure that may be produced by the animal in reaching over the fence.

The wires that form the member 4 are provided with central ring portions 12 and 13. The ends of the rings 12 and 13 are located in spaced relation to each other, as shown in Figs. 4 and 5. The distances between the ends of the ring portions 12 and 13 are slightly less than the diameter of the parallel wires that form the longitudinal strands of the fabricated fence wire and so that the wires 10 and 11 may be snapped over the longitudinally extending fence wires. Preferably, the direction of the turns in forming the rings 12 and 13 are opposite to each other and so that when the upper wire 10 is placed in position on the upper parallel wire of the fence, it is necessarily rotated in one direction to place the wire 10 at right angles to the fence 1 while the lower wire 11, after the adjoining parallel wire of the fence has been snapped into its ring, must necessarily be rotated in the opposite direction to place it at right angles to the fence. Thus, when the two wires are joined together at their ends, an upward movement of the member, even though it is placed in a plane that approximates the plane of the fence, will be prevented by the ring 13 and a downward movement will be prevented by the ring 12 and, furthermore, one or the other of the rings 12 or 13 will prevent the members 4 from being turned to the exact plane of the fence by reason of the reverse direction in which the central portions of the wires 10 and 11 are bent to form the rings. Thus, once the wires 10 and 11 are placed in position on the adjoining parallel wires of the fence and the ends of the wires 10 and 11 are secured together, the members 4 will be securely connected to the parallel wires of the fence.

Where it is desired to locate parallel wires in spaced relation with respect to the bottom edge wire of the fence and where the parallel wires of the fence are usually positioned close together, one of the wires of the member 4 may be secured to one of the wires of the fence and the other of the wires of the member 4 may be connected, not to the adjoining wire, but to a parallel wire spaced from the lower wire of the fence about equal to the distance between the rings 13 and 12. Also, where the protecting means is to be used for preventing animals from forcing their way beneath the lower edge of the fence, the wire 10 is placed on the bottom parallel wire of the fence, while the wire 11 is placed on a wire of the fence parallel to the bottom and spaced therefrom about the distance between the rings 12 and 13 and so that, when the wires 10 and 11 are secured together at their ends, the wires 3, which are also connected to the ends of the wires 10 and 11, will be placed on the ground or in the plane of the wire of the fence to which the wire 10 is connected.

The ends of the wires 10 and 11 are so bent that they may be readily interconnected and also connected to the wires 3. The ends of the wires 10 are provided with eyes 15 and the ends of the wires 11 are provided with loops 16. The ends 17 of the loops 16 are curved outward, the loops 16 being so formed that they will snap into the eyes 15 and limited in their inward movements by the end portions 17 and by the body portions of the wires 11. Thus, the loops 16 are so formed that they may be readily snapped into the eyes 15 and yieldingly held therein by their elasticity. In order to prevent the loops 16 from disengaging from the eyes 15 and in order to readily connect the members 4 with the parallel wires 3, strips 18 may be inserted in the loops and between the loops 16 and the eyes 15 which will prevent the loops 16 from passing outwardly from the eyes 15. In order to secure the strips 18 in their locked positions, short connecting wires 19 are connected to the strips 18. The connecting wires 19 are inserted through the eyes 15 and drawn, which draws the strips 18 in position within the loops 16 as shown in Figs. 6 and 7. The wires 3 may then be connected to the ends of the members 4 by means of the connecting wires 19 and, when the wires 3 are drawn more or less taut and their ends are secured, the planes of the members 4 may be located at right angles to the plane of the fence which will support the wires 3 and maintain them in parallel and spaced relation to the fence, and prevent stock from stretching the wires of the fence.

In the constructions shown in Figs. 8 to 11, the wire that forms the parts of the spacing members are provided with looped portions, the ends of the looped portions being returned so as to form engaging portions to maintain the spacing members in their connected relation to the wires of the fence on which they may be placed. Thus each of the wires that form the spacing members are provided with the central loop 25 and returned portions 26 and 27. The returned portions overlap each other and are also located in spaced relation with respect to each other for a distance sufficient to permit the elements, that form the spacing member, to be slipped over either two horizontal parallel wires of the fence, or a vertical wire of the fence, depending on the direction which the loops protrude with reference to the plane of the spacing member of which they form a part. Thus, the two overlapping curved portions 26 and 27 form fingers that retain the spacing member in position on one of the wires of the fence, when the elements are secured together, in the manner described in connection with the form of construction shown in Figs. 1 to 7.

The elements are connected together by means of the loops 15 and elastic parts 16 in the same manner that the spacing members, shown in Figs. 1 to 7, are connected together, and may be interlocked by the strips 18. The wires that are spaced from the plane of the fence, may also be connected to the spacing member illustrated in Fig. 11 by means of the wire 19. In the form of constructions shown in Figs. 1 to 7, and Fig. 9, the loops are so located, with reference to the elements, that they may be readily connected to horizontal parallel wires of the fence while, in the form of construction shown in Fig. 11, the loops so project from the spacing member that the spacing member may be more readily connected to vertical wires of the fence. It, however, is to be understood that the elements of the spacing members, shown in Figs. 1 to 7, may have their connecting central loops extend in a direction substantially at right angles to the planes of the spacing members for ready connection of the spacing members to the vertical wires of the fence and also, in the form of construction shown in Fig. 11, the connecting loops may be so formed as to lie substantially in the plane of the spacing members and thus the spacing members would be more adapted for connection with the horizontal wires of the fence.

Also, in the construction shown in Fig. 9 one element may have its loop formed right-handed and the other element formed left handed so that after placement on parallel wires the elements will be necessarily twined in opposite directions to bring their ends into a common plane and so that they may be interconnected.

I claim:

1. A plurality of members, means for connecting the members to parallel wires of a fence and a pair of wires connected to the outer ends of the members, whereby the parallel wires connected to the ends of the members may be located in spaced relation to and parallel with the plane of the fence or may be located in planes juxtaposed to the plane of the fence upon rotation of the members.

2. In a protector for wire fences, a plurality of members, each member formed of a pair of wires having ring shaped central portions for connecting the wires to parallel wires of the fence, and means for connecting the ends of the wires of the members, a pair of wires extending along the fence connected to the ends of the members, the members angularly movable on the wires of the fence to dispose the wires connected to the ends of the members in parallel relation to the plane of the fence and in variable spaced relation to the plane of the fence, dependent upon the angular position of the planes of the members of the plane of the fence.

3. In a wire fence protector, a plurality of members connected to parallel wires of the fence and formed of pairs of wires bent to form ring-shaped central portions for engaging the parallel wires of the fence by movements of the wires of the members towards each other, the ends of the wires of the members having interlocking parts that interlock so as to secure the wires of the member in the position that they are placed on the parallel wires of the fence.

4. In a wire fence protector, a plurality of members connected to parallel wires of the fence and formed of pairs of wires bent to form ring-shaped central portions for engaging the parallel wires of the fence by movements of the wires of the members towards each other, the ends of the wires of the members having resilient interlocking parts that interlock so as to secure the wires of the members in the position that they are placed on the parallel wires of the fence, and connecting wires inserted in the interlocking parts for preventing the disengagement of the interlocking parts and for connecting the ends of the members to the wires extending parallel to the plane of the fence.

5. In combination wth a wire fence, a plurality of members, each member formed of two wires, each wire having a central looped portion open to receive a wire of the fence, a pair of wires extending parallel to the fence and connected to the outer ends of the members.

In witness whereof I have hereunto signed my name to this specification.

HENRY H. SCHUETTE.